Patented Dec. 3, 1929

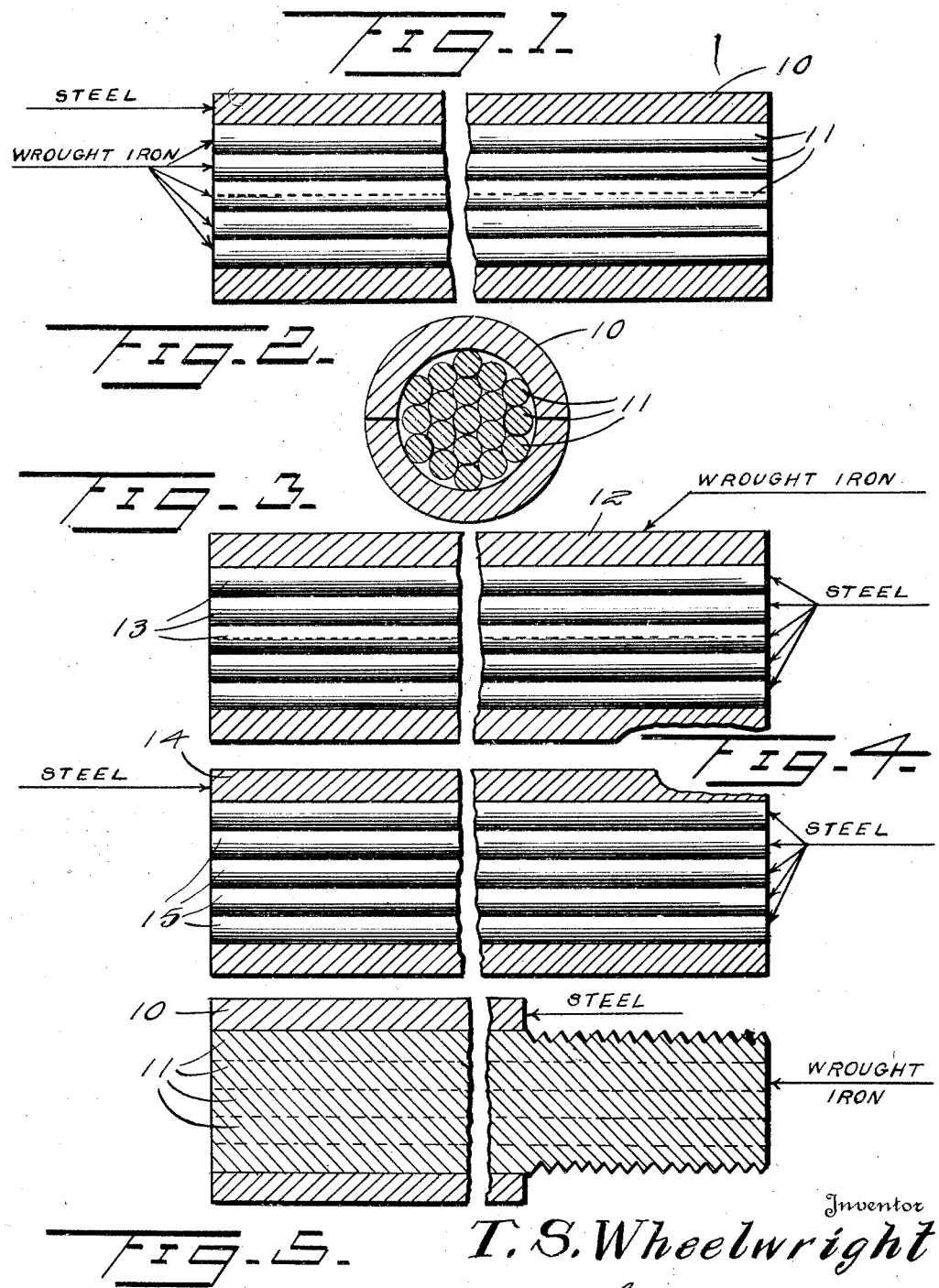

1,738,487

UNITED STATES PATENT OFFICE

THOMAS S. WHEELWRIGHT, OF RICHMOND, VIRGINIA, ASSIGNOR TO OLD DOMINION IRON AND STEEL WORKS, OF RICHMOND, VIRGINIA

METHOD OF MAKING FASCES BOLT STOCK

Application filed January 18, 1927. Serial No. 161,883.

This invention relates to new and useful improvements in bolts, and particularly to bolts which are especially adapted for heavy work, such as the staybolts in boilers, engine bolts, and the like.

The principal object of the invention is to provide a bolt stock which will have great tenacity, and tensile strength, so that the bolts made therefrom will be suitable for heavy work.

Another object is to provide a bolt stock of this character which is capable of easy threading, and which will still have the desired durable qualities for the services to be performed.

Another object resides in the particular manner in which the stock is built up, and the treatment given thereto, to produce the required durability in the bolts made therefrom.

Other objects and advantages will be apparent from the following description when taken in connection with the accompanying drawing.

In the drawing:

Figure 1 is a vertical longitudinal sectional view through the form of stock which includes the steel jacket, and wrought iron fillers, the fillers being in elevation.

Figure 2 is a vertical transverse sectional view through the stock of Figure 1.

Figure 3 is a view similar to Figure 1, but showing the jacket formed from wrought iron, and the fillers formed from steel.

Figure 4 is a sectional view, similar to Figures 1 and 3, but showing the jacket and fillers of steel.

Figure 5 is a sectional view, similar to Figure 1, but showing the steel jacket cut away at one end, to expose the wrought iron interior, in which are cut threads.

Referring particularly to the accompanying drawing, and especially to Figures 1 and 2, there is shown a cylindrical jacket 10, formed preferably of steel of low carbon content, such jacket being formed in two semi-cylindrical portions. Within the jacket, and extending lengthwise therein, are the solid metal bars, 11, formed of wrought iron. In Figure 3 there is shown another form of the stock, from which bolts are formed, such stock having the jacket 12, formed from wrought iron, and filled with the bars 13, of steel of low carbon content. The provision of the wrought iron jacket renders the cutting of threads easy, while the steel fillers render the stock very strong, and especially adapts it for making bolts which are subject to heavy strains.

In Figure 4 there is shown a steel jacket 14, in which are disposed the steel filler bars 15. This form is especially adapted for bolts which are subject to surface friction.

In making one of these fagots, I take steel ingots or wrought iron billets, roll them to a width of approximately six (6) inches, and a thickness of one-half (½) inch, after which such sheets are curled, or bent, into semi-cylindrical shape. Two of these semi-cylindrical plates are placed together to form a complete jacket. I then fill the jacket with steel, or wrought iron bars, of approximately three-eighths of an inch in diameter, and of equal or greater length than the jacket. The structure thus built up is then subjected to heat, and rolled, for the purpose of causing the jacket and fillers to weld together, and to produce the proper diameter of the stock for the resultant bolts to be cut therefrom. The jacket and the filler bars, thus welded together, will have great tensile strength, and bolts cut therefrom will be capable of strains and stresses incident to heavy duty.

In the form shown in Figures 1, 2, and 5, and especially Figure 5, the jacket is of steel, while the filler bars are of wrought iron. This permits the cutting away, of a portion of the steel jacket, down to the wrought iron center or core, so that the threads may be easily cut in the softer iron. The remainder of the steel jacket forms a tough bearing surface.

In the form shown in Figure 3, the threads are adapted to be cut directly in the wrought iron jacket.

The wrought iron jacket will permit heating the stock to a higher temperature, for rolling, without danger of burning, with the result that a more complete weld of the steel fillers is produced. Furthermore, the iron jacket, of the finished staybolt, has been found, in practice, to resist the service conditions in a boiler, of varied temperatures, and chemical content of water, to a greater extent than steel.

What is claimed is:

The method of making bolts consisting in forming a shell of steel, filling the shell with a plurality of wrought iron rods of uniform cross section throughout their length, heating and rolling the fagot thus formed to provide a composite bar, turning down a portion of the steel shell to expose the iron core and cutting threads in the exposed portion of the core.

In testimony whereof, I affix my signature.
THOMAS S. WHEELWRIGHT.